US012620407B2

(12) United States Patent
Castro Borquez et al.

(10) Patent No.: US 12,620,407 B2
(45) Date of Patent: May 5, 2026

(54) NEURAL MODELER OF AUDIO SYSTEMS

(71) Applicant: Neural DSP Technologies Oy, Helsinki (FI)

(72) Inventors: Douglas Andres Castro Borquez, Helsinki (FI); Eero-Pekka Damskägg, Helsinki (FI); Athanasios Gotsopoulos, Helsinki (FI); Lauri Juvela, Helsinki (FI); Thomas William Sherson, Utrecht (NL)

(73) Assignee: Neural DSP Technologies Oy, Helsinki (FI)

( * ) Notice: Subject to any disclaimer, the term of this patent is extended or adjusted under 35 U.S.C. 154(b) by 556 days.

(21) Appl. No.: 18/067,069

(22) Filed: Dec. 16, 2022

(65) Prior Publication Data

US 2023/0119557 A1 Apr. 20, 2023

Related U.S. Application Data

(63) Continuation of application No. 16/738,512, filed on Jan. 9, 2020, now Pat. No. 11,532,318.

(Continued)

(51) Int. Cl.
*G06F 3/16* (2006.01)
*G10L 15/16* (2006.01)
(Continued)

(52) U.S. Cl.
CPC .............. *G10L 25/30* (2013.01); *G06F 3/165* (2013.01); *G10L 15/16* (2013.01); *H04R 3/04* (2013.01)

(58) Field of Classification Search
CPC ......... G10L 25/30; G10L 15/16; G06F 3/165; H04R 3/04
See application file for complete search history.

(56) References Cited

U.S. PATENT DOCUMENTS 6,292,791 B1 9/2001 Su et al.
6,476,308 B1 11/2002 Zhang
(Continued)

FOREIGN PATENT DOCUMENTS

WO 2017/102972 A1 6/2017
WO 2019/199995 A1 10/2019

OTHER PUBLICATIONS

Julian Parker; Fabian Esqueda; André Bergner, "Modelling of Nonlinear State-Space Systems Using a Deep Neural Network", Proceedings of the 22nd International Conference on Digital Audio Effects (DAFx-19), Birmingham, UK, Sep. 2-6, 2019. (Year: 2019).*
(Continued)

*Primary Examiner* — Joseph Saunders, Jr.
(74) *Attorney, Agent, or Firm* — Thomas E. Lees, LLC

(57) ABSTRACT

A process is provided for training a neural network that digitally models an audio system. A sound source is utilized to electrically couple a test signal into an input of a reference audio system. The output of the reference audio system is collected into an audio interface coupled to a computer. A neural network is then trained using the test signal and the captured information to derive a set of weight vectors with appropriate values such that the overall output of the neural network converges towards an output representative of the reference audio system, and a signal in the time domain from a musical instrument is processed through the trained neural network with a latency under 20 milliseconds. A graphical user interface then outputs a graphical representation of the trained neural network, where the graphical representation visually displays at least one virtual control for interaction by a user.

20 Claims, 10 Drawing Sheets

Related U.S. Application Data

(60) Provisional application No. 62/941,986, filed on Nov. 29, 2019.

(51) Int. Cl.
    G10L 25/30      (2013.01)
    H04R 3/04       (2006.01)

(56) References Cited

U.S. PATENT DOCUMENTS

| | | | |
|---|---|---|---|
| 8,600,068 B2 | 12/2013 | DeBoer et al. | |
| 8,796,530 B2 | 8/2014 | Kemper | |
| 9,099,066 B2 | 8/2015 | Welch | |
| 9,626,949 B2 | 4/2017 | Wang et al. | |
| 2007/0227344 A1* | 10/2007 | Ryle | G10H 3/188 |
| | | | 84/723 |
| 2008/0037804 A1 | 2/2008 | Shmunk | |
| 2008/0267419 A1* | 10/2008 | DeBoer | G10H 3/186 |
| | | | 706/15 |
| 2014/0216235 A1 | 8/2014 | Alt | |
| 2014/0260906 A1 | 9/2014 | Welch | |
| 2015/0278686 A1 | 10/2015 | Cardinaux et al. | |
| 2016/0179458 A1 | 6/2016 | Chase | |
| 2016/0328501 A1 | 11/2016 | Chase | |
| 2019/0164052 A1 | 5/2019 | Sung et al. | |

OTHER PUBLICATIONS

Fichas, Felix et al.; "Virtual Analog Modeling of Guitar Amplifiers with Wiener-Hammerstein Models"; Department of Signal Processing and Communications; Hamburg, Germany; Mar. 2018.
Yao, J. et al.; "Coarse-to-fine Optimization for Speech Enhancement"; Apple Inc.; arXiv:1908.08044v1; Aug. 21, 2019.
Martin-Donas, Juan Manuel et al.; "A Deep Learning Loss Function Based on the Perceptual Evaluation of the Speech Quality"; IEEE Signal Processing Letters; vol. 25, No. 11; Nov. 2018.
Damskagg, Eero-Pekka et al.; "Deep Learning for Tube Amplifier Emulation"; Acoustics Lab, Dept. of Signal Processing and Acoustics; Aalto University; Espoo, Finland; arXiv:1811.00334v1; Nov. 2018.
Feng, Berthy et al.; "Learning Bandwidth Expansion Perceptually-Motivated Loss"; May 2019.
Schmitz, Thomas et al.; "Real Time Emulation of Parametric Guitar Tube Amplifier with Long Short Term Memory Neural Network"; Department of Electrical Engineering and Computer Science; Liege University; Montefiore Institute; Belguim; Apr. 2018.
Damskagg, Eero-Pekka et al.; "Real-Time Modeling of Audio Distortion Circuits with Deep Learning"; Acoustics Lab, Department of Signal Processing and Acoustics; Aalto University; Espoo, Finland; Jan. 2019.
Su, Jiaqi et al.; "Perceptually-Motivated Environment-Specific Speech Enhancement"; 2019.
Crama, Philippe et al.; "Computing an Initial Estimate of a Wiener-Hammerstein System With a Random Phase Multisine Excitation"; IEEE Transactions on Instrumentation and Measurement; vol. 54, No. 1,; Feb. 2005.
Extended European Search Report for European Patent Application No. 20151065.8; European Patent Office; Munich, Germany; May 29, 2020.
Hawley, Scott H et al.; "SignalTrain: Profiling Audio Compressors with Deep Neural Networks"; arXiv:1905.11928v2; ; May 30, 2019.
Ramirez, Marco A. Martinez et al.; "End-to-End Equalization with Convolutional Neural Networks"; Proceedings of the 21st International Conference on Digital Audio Effects (DAFx-18); Aveiro, Portugal; Sep. 4-18, 2018.
Wright, Alec et al.; "Perceptual Loss Function for Neural Modelling of Audio Systems"; arXiv:1911.08922v1; Nov. 20, 2019.
Martinez, Marco et al; "Modeling of nonlinear audio effects with end-to-end deep neural networks"; located at https://www.groundai.com/search/?text=modeling+of+nonlinear+audio+effects+with+end-to-end+deep+neural+networks&sort=_score; Oct. 15, 2018.
Mendoza, David Sanchez; "Emulating Electric Guitar Effects with Neural Networks"; Graduation Project, Computer Engineering, Universitat Pompeu Fabra; Sep. 2005.
Catala, Omar del Tejo; "Audio Effects Emulation with Neural Networks"; Universitat Politecnica de Valencia; 2016/2017.

* cited by examiner

200

202

MODEL PREDICTION — 204

APPLY PERCEPTUAL LOSS FUNCTION — 206

ADJUST NEURAL NETWORK PARAMETERS — 208

NO　DONE TRAINING? — 210

YES

OUTPUT — 212

300

400

500

502

700

702

704  INPUT

706  NON-LINEAR CONVOLUTION

706  NON-LINEAR CONVOLUTION

706  NON-LINEAR CONVOLUTION

706  NON-LINEAR CONVOLUTION

706  NON-LINEAR CONVOLUTION

706  NON-LINEAR CONVOLUTION

708  OUTPUT

NEURAL MODELER OF AUDIO SYSTEMS

CROSS REFERENCE TO RELATED APPLICATIONS

This application is a continuation of U.S. patent application Ser. No. 16/738,512, filed Jan. 9, 2020, now allowed, which claims the benefit of U.S. Provisional Patent Application Ser. No. 62/941,986, filed Nov. 29, 2019, entitled NEURAL MODELER OF AUDIO SYSTEMS, the disclosure of which is hereby incorporated by reference.

BACKGROUND

Various aspects of the present disclosure relate generally to modeling audio systems, and more specifically to the use of artificial neural networks to model audio systems.

Amplifier modeling is a process by which a physical amplifier, e.g., a guitar amplifier, is emulated by a modeling platform. Amplifier modeling can be implemented using analog circuitry, digital signal processing, or a combination thereof. In this regard, amplifier modeling provides a flexible way to emulate a large number of different physical amplifiers using a common platform of hardware and software.

BRIEF SUMMARY

According to aspects of the present disclosure, a process is provided for training a neural network that digitally models an audio system. The process comprises utilizing a sound source to electrically couple a test signal into an input of a reference audio system. The process also comprises collecting an output of the reference audio system into an audio interface coupled to a computer to store captured information. The process further comprises training a neural network using the test signal and the captured information. The training is carried out to derive a set of weight vectors with appropriate values such that the overall output of the neural network converges towards an output representative of the reference audio system, and such that a signal in the time domain from a musical instrument is processed through the trained neural network with a latency under 20 milliseconds. Additionally, the process comprises outputting to a graphical user interface, a graphical representation of the trained neural network, the graphical representation visually displaying at least one virtual control. Further, the process comprises enabling a user to interact with the virtual control of the graphical representation of the trained neural network via the graphical user interface to define a virtualization of the reference audio system.

According to further aspects of the present disclosure, a process is provided for creating digital audio systems. The process comprises utilizing a sound source to electrically couple a test signal into an input of a reference audio system. The process also comprises collecting an output of the reference audio system into an audio interface coupled to a computer to store captured information. Additionally, the process comprises training a neural network using the test signal and the captured information to derive a set of weight vectors with appropriate values such that the overall output of the neural network converges towards an output representative of the reference audio system. Here, the training digitally models a non-linear behavior of the reference audio system, models a first linear aspect of the reference audio system, and models a second linear aspect of the reference audio system. Moreover, the training is carried out by repeatedly performing operations comprising predicting by the neural network, a model output based upon an input, where the output approximates an expected output of the reference audio system, determining an error, and adjusting the weight vectors to minimize the error. The process still further comprises outputting a neural model file upon training, and outputting to a graphical user interface, a graphical representation of the trained neural network in the neural model file, the graphical representation visually displaying at least one virtual control. The process also comprises enabling a user to interact with the virtual control of the graphical representation of the trained neural network via the graphical user interface to define a virtualization of the reference audio system.

According to additional aspects of the present disclosure, a process for creating digital audio systems is provided. The process comprises training a neural network that digitally models a reference audio system. Training the neural network is carried out by repeatedly performing predicting, evaluating, and updating operations. The prediction operation comprises predicting by the neural network, a model output based upon an input, where the output approximates an expected output of the reference audio system. Here, the prediction is carried out in the time domain. The evaluation operation comprises applying a perceptual loss function to the neural network based upon a determined psychoacoustic property, where the perceptual loss function is applied in the frequency domain. The update operation comprises adjusting the neural network responsive to the output of the perceptual loss function, e.g., changing at least one parameter of the neural network responsive to the output of the perceptual loss function. The process further comprises outputting a neural model file that can be loaded to generate a virtualization of the reference audio system, e.g., after the neural network has been suitably trained.

According to a further aspect of the present disclosure, a process comprises training a neural network that digitally models a reference audio system. More particularly, training enables the neural network to implement a first role that models at least one nonlinearity of the reference audio system and a second role that models at least one linear aspect and/or at least one temporal dependency of the reference audio system. Moreover, training may be carried out using a perceptual loss function. Here, the perceptual loss function is implemented by a frequency domain process based upon a determined psychoacoustic property. Yet further, the process may comprise outputting a neural model file that can be loaded to generate a virtualization of the reference audio system.

According to yet further aspects of the present disclosure, a process may comprise training each role of the neural network at the same time such that all the parameters of the model are learned simultaneously. According to the above-mentioned aspect, the first role, or first sub neural network, and the second role, or second sub neural network, are trained simultaneously. Thus, all parameters of the model are learned simultaneously in a time saving manner.

According to yet further aspects of the present disclosure, training the neural network to implement a first role that models a nonlinearity of the reference audio systems may comprise modeling a non-linear behavior of the reference audio system. Additionally, training the neural network to implement a second role that models a first linear aspect and/or a temporal dependency of the reference audio system comprises modeling a first linear aspect of the reference audio system. Training the neural network further comprises modeling a linear aspect of the reference audio system. The process further comprises training such that a third role of the neural network models a second linear aspect of the reference audio system, wherein the neural network forms a Wiener-Hammerstein topology. Hence, nonlinear reference audio systems may be decomposed into linear and nonlinear transfer functions. Thus, finding a singular transfer function is easier than without using the Wiener-Hammerstein topology or model.

According to yet further aspects of the present disclosure, modeling a nonlinearity of the reference audio system, modeling a first linear aspect and/or temporal dependency of the reference audio system, and modeling a second linear aspect of the reference audio system may be arranged in series and/or in parallel and/or in a combination thereof.

According to yet further aspects of the present disclosure, training a neural network may comprise training a convolutional neural network. By using a convolutional neural network, memory requirements may be significantly reduced in contrast to non-convolutional neural networks. Thus, by using a convolutional neural network, training time can be drastically reduced. Hence, using convolutional neural networks may be preferred when time and/or computational requisites demand this.

According to yet further aspects of the present disclosure, applying a perceptual loss function to the neural network may comprise establishing a loudness threshold such that a signal below the threshold is not optimized further. Thus, time and/or computational resources may be saved when applying a perceptual loss function in combination with applying a loudness threshold to the neural network.

According to yet further aspects of the present disclosure, establishing said loudness threshold may comprise establishing a threshold of hearing for each of multiple frequency bins, wherein, for each frequency bin, a loudness threshold may be independently set under which a signal is not optimized further in order to optimize further that particular frequency bin.

According to yet further aspects of the present disclosure, applying a perceptual loss function to the neural network may comprise implementing frequency masking such that a frequency component is not further processed if a computed error is below a masking threshold. The masking threshold is based upon a target signal. Thus, time and/or computational resources when training the neural network can be effectively used and/or saved as long as the computed error is below a threshold.

According to yet a further aspect of the present disclosure, implementing a frequency masking may comprise selecting a specific masking threshold for each of multiple frequency bins. By setting different masking thresholds for different frequency bins, user-specific application of a perceptual loss function to the neural network can be achieved as function of the frequency bins. Therefore, time and/or computational resources may be saved while achieving a user-specific trained neural network.

According to a further aspect, training a neural network may comprise training a recurrent neural network. Thus, by using feedback within the neural network (direct, indirect and/or lateral feedback), the recurrent neural network shows a memory effect. Thus, training time may be shortened.

According to yet further aspects of the present disclosure, initializing the neural network may be based on measurements of the reference audio system. Hence, the training of the network may be based on actual measurement signals of the system which is to be mimicked.

According to a further aspect, initializing the neural network may comprise initializing the neural network using measurements based on sine sweeps. Thus, initializing the neural network is standardized and easily reproducible.

According to a further aspect, the neural network may be extended to any combination and/or order of waveshapers and filters. Waveshapers, or waveshaping functions, may be e.g. sin, arctan, and/or polynomial functions. Filters may be e.g. low-pass filter, high-pass filter, and/or bandpass filter. Thus, training time of the neural network may be reduced and/or computational resources while training the neural network may be effectively used when using the neural network in combination with waveshapers and/or filters, as these additional "nodes" do not have to be trained in a preferred situation. User-specific waveshapers and/or filters may be used.

According to a further aspect, the process may comprise computing an error signal. The error signal may be computed by receiving a target signal and an associated predicted signal given from the neural network, and computing therefrom in the time domain, the error signal. Further, computing an error signal can comprise converting the target signal and the error signal to the frequency domain. This may be done be any suitable transformation, as e.g. a Fourier transformation. Further, computing an error signal can further comprises applying critical band filtering, such as bandpass filtering with small bandwidth, to the target signal and to the error signal in the frequency domain. By converting both, the error signal and the target signal to the frequency domain, band filtering can be applied and easy comparison between both signals is enabled in the frequency domain.

According to a further aspect, computing the error signal may comprise thresholding the error signal in the frequency domain according to a frequency-dependent threshold level. Herein, the threshold level is established based upon a predetermined threshold of hearing. By thresholding the error signal, a trade-off between computational effort computing said error signal and neglecting signals below said threshold level may be achieved.

According to a further aspect, computing said error signal may comprise establishing a frequency-dependent mask thresholding level based on the target. Here, thresholding the error signal in the frequency domain according to a frequency-dependent threshold level can further comprise thresholding the error signal in the frequency domain according to the established frequency-dependent mask thresholding level. By thresholding the transformed target and error signal, as described in the preceding paragraph, irrelevant target signal frequencies may be filtered out. Hence, a relevant final error can be computed quicker.

According to a further aspect, all of the operations may be differentiable. Therefore, gradients with regard to the predicted signal can be calculated.

According to yet a further aspect, the evaluation operation may comprise applying a perceptual loss function to the neural network, where the perceptual loss function is applied preferably in the frequency domain. In this regard, the perceptual loss function is implemented by receiving a target signal and sorting the received target signal into target critical bands. For instance, one or more target critical bands may be based upon a range of frequencies. The perceptual loss function is further implemented by generating from the target signal in each target critical band, an associated masking threshold. Moreover, the perceptual loss function is implemented by receiving an error signal generated from the target signal and an associated prediction signal, where the error signal is sorted into error signal critical bands. Analogous to the target critical bands, one or more error signal critical bands may be based upon a range of frequencies. The perceptual loss function is still further implemented by applying a threshold of hearing function to the error signal. Here, an error signal below an associated hearing threshold of a corresponding error signal critical band does not contribute to a final error. Also, the perceptual loss function is implemented by applying a masking function to the error signal. Here, an error signal below the associated masking threshold of a corresponding error signal critical band does not contribute to the final error. The update operation comprises changing at least one parameter of the neural network responsive to the final error output of the perceptual loss function.

The process for creating and using digital audio systems may further comprise loading the neural model file into a model audio system to define a virtualization of the reference audio system. The process further comprises outputting an audio signal using the virtualization such that the output of the model audio system includes at least one characteristic of an output of the reference audio system. Hence, emulation of the reference audio system by the neural network is provided.

Further, outputting the audio signal may be performed upon coupling a musical instrument based on an input from the musical instrument to the model audio system. As such, upon coupling a musical instrument to the model audio system, a user can perform using the virtualization in place of the reference audio system such that an output of the model audio system includes at least one characteristic of an output of the reference audio system.

According to further aspects of the present disclosure, a process for creating and using digital audio systems is provided. The process comprises training a neural network that digitally models a reference audio system. Training the neural network is carried out by repeatedly performing predicting, evaluating, and updating operations. The prediction operation comprises predicting by the neural network, a model output based upon an input, where the output approximates an expected output of the reference audio system. Here, the prediction is carried out in the time domain.

According to a further aspect, a data processing system comprising a processor configured to perform any one or more of the process(es) as described prior, is disclosed. Such a data processing system may be a control unit, preferably an electronic control unit.

According to a further aspect, a computer program product comprising instructions is disclosed, which, when the program is executed by a computer, cause the computer to carry out any one or more of the process(es) as described prior.

According to a further aspect, a computer-readable storage medium comprising instructions is disclosed, which, when executed by a computer, cause the computer to carry out any one or more of the process(es) as described prior. Such a computer-readable storage medium may be e.g., a RAM, hard drive, flash memory or ROM.

According to yet further aspects of the present disclosure, a hardware system is provided. The hardware system includes an analog to digital converter, a digital to analog converter, and processing circuitry that couples to the analog to digital converter and the digital to analog converter. The processing circuitry includes a processor coupled to memory, where the processor executes instructions that train a neural network in a manner analogous to that described above. Specifically, the processor executes instructions that train a neural network that digitally models a reference audio system by repeatedly performing instructions. Such instructions are performed to predict by the neural network, a model output based upon an input, where the output approximates an expected output of the reference audio system, and the prediction is carried out in the time domain. Further, said instructions are performed to apply a perceptual loss function to the neural network, where the perceptual loss function is applied in the frequency domain. The perceptual loss function may be implemented to receive a target signal and sort the received target signal into target critical bands. Further, the loss function is implemented to generate from the target signal in each target critical band an associated masking threshold. Further, the loss function is implemented to receive an error signal generated from the target signal and an associated prediction signal, where the error signal is sorted into error signal critical bands. The loss function is further implemented to apply a threshold of hearing function to the error signal, wherein an error signal below an associated hearing threshold of a corresponding error signal critical band does not contribute to a final error. The perceptual loss function is further implemented to apply a masking function to the error signal, wherein an error signal below the associated masking threshold of a corresponding error signal critical band does not contribute to the final error. Further, the instructions are performed to change at least one parameter of the neural network responsive to the final error output of the perceptual loss function. Further, the processor executes instructions that generate a neural model file. Moreover, the processor loads the virtualization into a model audio system. Thus, a virtualization of the reference audio system is defined. As such, upon coupling a musical instrument to the hardware system, a user can perform using the virtualization in place of the reference audio system such that an output of the model audio system includes at least one characteristic of an output of the reference audio system.

The wording process as used herein may be understood as a method having method steps as described with regard to the above processes.

BRIEF DESCRIPTION OF THE SEVERAL
VIEWS OF THE DRAWINGS

DETAILED DESCRIPTION

Figure 1:
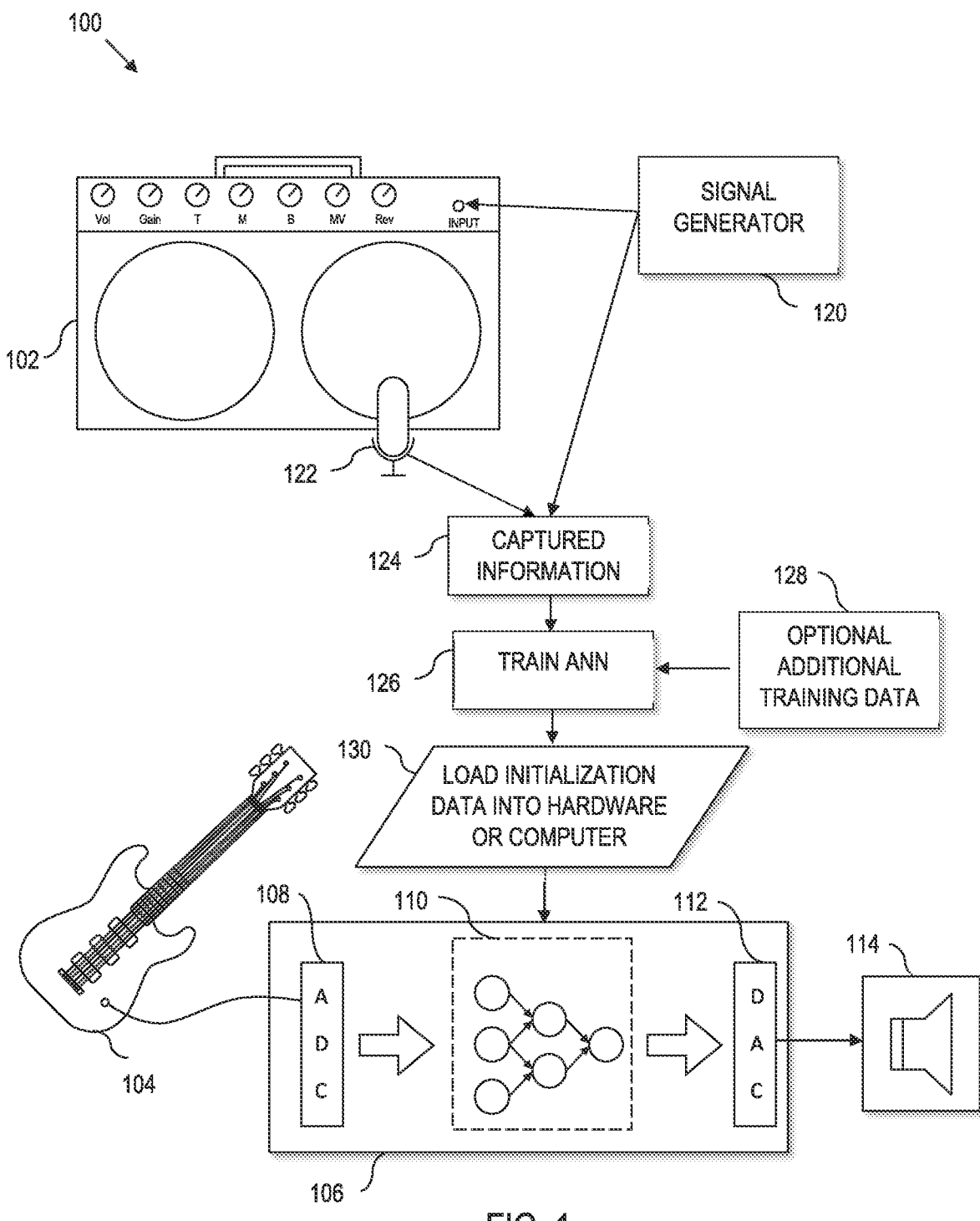
FIG. 1 is a block diagram illustrating various components that can be used for building and/or using a neural network that models a reference audio system.

Referring now to the drawings, and in particular to FIG. 1, a block diagram 100 illustrates various components that can be used for creating, constructing, editing, using, combinations thereof, etc., a neural network system to virtualize an audio system. For sake of clarity of explanation, the embodiment of FIG. 1 is described in the context virtualizing a reference audio system 102 that is implemented as a guitar amplifier.

Notably, it may not always be desirable or practical to use the reference audio system 102, e.g., when performing. However, aspects of the present disclosure provide a virtualization of the reference audio system 102 that can be used in lieu of the reference audio system 102.

More particularly, as shown, a user (e.g., musician) plugs an output of an instrument 104 (e.g., electric guitar) into a modeling audio system 106 that models at least some of the characteristic behavior of the reference audio system 102. In practical terms, the modeling audio system 106 will comprise some form of analog circuitry, digital circuitry, and software (e.g., a dedicated hardware unit or a general purpose computer in combination with an audio interface). For instance, within the modeling audio system 106, the instrument signal is processed through an analog to digital converter 108 (ADC) that converts the analog audio signal into a digital signal equivalent. The digital signal is input into a virtualization 110 that is specifically trained or otherwise programmed to mimic some or all of the characteristics of the reference audio system 102. The output of virtualization 110 is processed by a digital to analog converter 112 (DAC) that converts the digital output into an analog signal equivalent of the processed output, and the analog output is coupled to an amplifier/speaker 114 where the sound of the signal is produced.

As will be described in greater detail herein, modeling of the reference audio system 102 is carried out using at least one artificial neural network. As such, aspects herein define a neural modeler of audio systems. In practical applications, the virtualization 110 includes a model and at least one initialization file (referred to herein as a neural model file). When the neural model file is loaded into the model, the model becomes specifically configured such that the model output resembles a corresponding reference audio system. In this regard, the model can be extended to resemble different reference audio systems, e.g., different makes and/or models of amplifiers, by loading different neural model files into the model, each neural model file corresponding to a different reference audio system.

The virtualization 110 can also include additional functionality to carry out processing that is extrinsic to the reference audio system 102. For instance, the virtualization 110 can include a user interface that enables a user to select emulations of different speakers, speaker cabinets, dynamics processing, effects processing, equalization, etc., that is not within the native capability of the reference audio system 102. Such processing can be consistent across multiple neural model files (e.g., to implement a common set of interface options), such processing can vary based upon the loaded neural model file, combinations thereof, etc.

For sake of introduction and clear explanation, an example way to train an artificial neural network is to capture and use information from the reference audio system 102 itself. In the illustrated example, a sound source 120

(e.g., a sweep generator) couples a test signal into an input of the reference audio system 102. The output of the reference audio system 102 is captured (e.g., via a microphone 122, direct out, or other capture device) to define captured information 124 representing one or more samples collected from the reference audio system 102. The captured information can also include a capture of the test signal generated by the sound source 120, e.g., where such information is not otherwise available.

The captured information 124 of the reference audio system 102 is utilized either as training data, or to generate training data to train an artificial neural network 126 so as to model the reference audio system 102. For instance, in some embodiments, the captured information 124 (e.g., output of the reference audio system 102 and/or the test signal) is processed, e.g., by collecting a set of features such as signal processing measurements, which are stored in memory for further use. In this regard, feature extraction from the captured information 124 may be considered a pre-training operation to generate training data.

In some embodiments, other training data 128 can be used in addition to or in lieu of the training data derived from the captured information 124 to train the artificial neural network 126. The other training data 128 may be already sorted into feature sets so that the data can be directly applied as training data. In other example implementations, the other training data may include audio such as additional test signals, pre-recorded samples, real-time generated audio signals such as samples of an instrument played through the reference audio system 102, noise, etc. Here, the pre-training step of feature extraction should be carried out to prepare the optional additional training data 128 for use to train the artificial neural network 126.

With necessary pre-training operations performed, the artificial neural network 126 is trained. In an example embodiment, the network is comprised of neurons (mathematical functions) where each neuron has any number of inputs. A weight vector is defined based upon the number of inputs to each neuron. Thus, each neuron has a corresponding weight vector. These weights are fixed when the training is complete (e.g., at which time, the artificial neural network is ready for use in a manner that models at least one characteristic of an output of the reference audio system 102). However, during training, these weights are adjusted to tune the network. Example training operations are described more fully herein. Regardless of the training technique used, the purpose of training the artificial neural network 126 is to derive a set of weight vectors with appropriate values such that the overall output of the artificial neural network converges towards an output representative of the reference audio system 102.

With the artificial neural network 126 trained, a process can store, archive, save, load, etc., a neural model file 130 (e.g., an initialization file) created as part of the training process. In practical embodiments, the neural model file 130 includes sufficient data such that that when read out and processed by the modeling audio system 106, a functioning model of the reference audio system 102 is realized. Thus, for example, the neural model file 130 can include some or all of the parameters required by the model, such as weights, weight vectors, information about the model structure and size, meta data, audio-related parameters (e.g., sample rate etc.), combinations thereof, etc.

Thus, as used herein, the artificial neural network 126 is a computing system, i.e., a network of nodes, which implements a model that can be trained (learn how to simulate) or is otherwise programmed (e.g., configured by the neural model file 130) to simulate the performance of the reference audio system 102.

By contrast, the virtualization 110 is the system that is being used in lieu of reference audio system 102. In this regard, the virtualization 110 can be the artificial neural network 126, such as where the modeling audio system 106 itself is used to build the neural network as described above. The virtualization 110 can alternatively include a copy of the artificial neural network 126 or a variation thereof, such as where a separate device independent of the modeling audio system 106 is used to build the artificial neural network 126. Here, the virtualization 110 can include a specific neural network, e.g., the artificial neural network 126, or the neural network can have a general framework that enables the modeling audio system 106 to model different reference amplifiers by loading an associated neural model file 130 into the modeling audio system 106 for each reference audio system to be modeled.

In some embodiments, the virtualization 110 can also include other capabilities. For instance, the virtualization 110 can include metadata, initialization data, executable code to carry out additional processing (effects, virtual tone controls, and other signal processing) to make the device more flexible and usable.

The modeling audio system 106 is essentially the entire circuitry including conversion circuitry (e.g., ADC and DAC) the virtualization 110, optional additional signal processing, e.g., other processing not provided by the virtualization 110, etc. Here, the modeling audio system 106 (e.g., dedicated hardware or computer and audio interface) can include a graphical user interface, user interface, virtual controls, physical controls, etc., to make the system flexible and usable as a tool for a musician.

Notably, an artificial neural network forms a core component of the modeling audio system 106 that is suitable for use in real-time applications. Thus, the modeling audio system 106 is capable of processing audio in the time domain (i.e., the input and the output of the neural network correspond to time domain audio signals). Examples of building, training, using, combinations thereof, etc., the artificial neural network are set out in greater detail herein.

Training is conceptually illustrated in FIG. 1 outside the modeling audio system 106 solely for clarity of example. In practical applications, training the artificial neural network 126 can occur within the modeling audio system 106 itself. For instance, the modeling audio system 106 can include the sound source 120, e.g., signal generator, means (e.g., built in microphone, audio input, etc.) to capture the output of the reference audio system 102, and other inputs, outputs and processing necessary to implement training as described more fully herein. Moreover, the modeling audio system 106 can include memory to store one or more files so that the modeling audio system 106 can be controlled by a user to load any practical number of alternative reference audio systems (e.g., guitar amplifier virtualizations). In other embodiments, initialization files (e.g., neural model files 130) representing various reference audio systems can be created external to the modeling audio system 106, and can be loaded into memory of the modeling audio system 106. In this way, users can create and share virtualizations.

Building a Model

Figure 2:
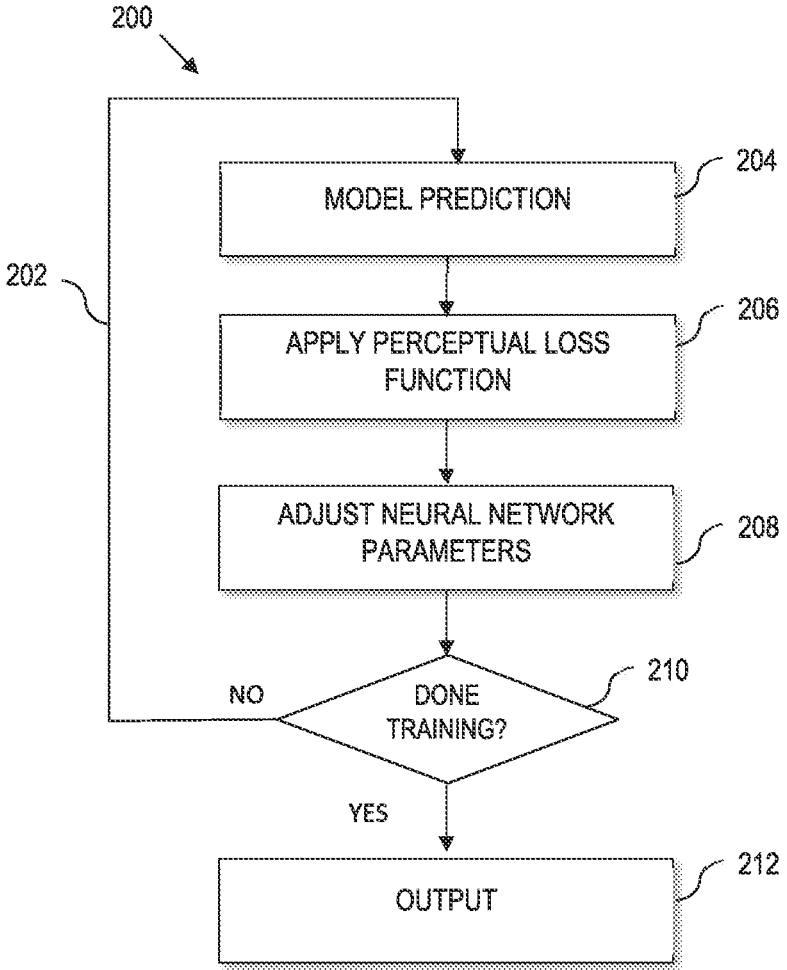
FIG. 2 is a flow chart illustrating a process for training an artificial neural network according to aspects of the present disclosure.

Referring to FIG. 2, a process 200 is provided for creating digital audio systems. The process 200 can be utilized, for example, to create the artificial neural network 126, neural model file 130, virtualization 110, combination thereof, etc., (FIG. 1). Moreover, the process 200 can be carried by the modeling audio system 106 (FIG. 1), by external dedicated hardware, by an external computer, etc.

Training Generally

The process 200 comprises training, at 202, a neural network that digitally models a reference audio system. In some embodiments, training is carried out until a predetermined stopping condition is met. For instance, a stopping condition may include processing all available training data, e.g., for a predetermined number of iterations, such as up to, or exceeding 20,000 iterations. A predetermined stopping condition can also include converging on a representation that is similar to the reference audio system within a predetermined and designated error. Also, in some embodiments, a stopping condition may include a manual/user initiated stop, or other established condition.

In a reference audio system such as a typical guitar amplifier, an output of the reference audio system may depend linearly or non-linearly on a corresponding input to the reference audio system. In practical applications, the nonlinearity need not extend over the entire range of input signal that can be applied to the reference audio system. Rather, the reference audio system may operate in such a way to have a linear range and a nonlinear range. The nonlinear range may be based upon amplitude, frequency, a combination thereof, other factors, etc. Regardless, the neural network should track such linear and/or non-linear relationships as closely as possible.

By way of example, training a neural network can comprise training a recurrent neural network (RNN). However, other neural network configurations can be utilized.

In practical applications, training of the artificial neural network is carried out by initializing the neural network based on training data, e.g., features such as measurements of the reference audio system. For instance, training data can be generated based upon inputting sine sweeps into the reference audio system, and capturing measurements of the reference audio system that are output in response to the sine sweeps. Thus, the neural network can be initialized using measurements based on sine sweeps. However, other test signals can also and/or alternatively be utilized. For instance, initialization can be carried out using measurements based on sine sweeps, noise, recordings of a musical instrument, real-time inputs, other recorded material, live performance data captured by a user playing an instrument plugged into the reference audio system 102, combinations thereof, etc., as described more fully with regard to FIG. 1.

In the illustrated process 200, the training at 202 includes repeatedly performing a set of operations, including predicting at 204, applying a perceptual loss function at 206, and adjusting parameters at 208. More particularly, the process includes predicting at 204, by the neural network, a model output based upon an input, where the output approximates an expected output (e.g., a target output) of the reference audio system. Notably, the prediction in example embodiments is carried out in the time domain.

Moreover, other time domain processing may also be carried out. For instance, the process 200 may additionally comprise computing an error based upon the model output and the expected output (e.g., target output) of the reference audio system responsive to the input.

In the illustrated process 200, the training at 202 also includes applying at 206, a perceptual loss function to the neural network. In some embodiments, the perceptual loss function is based upon a determined psychoacoustic property. Moreover, in example embodiments, the perceptual loss function is applied in the frequency domain.

Applying a perceptual loss function to the neural network can be implemented by establishing a loudness threshold such that a signal below the threshold is not optimized further. Such an approach improves the overall efficiency of the training process by avoiding time consuming computations that are not determined to result in an audible effect to an average listener. In an example implementation, establishing a loudness threshold is carried out by establishing a threshold of hearing for each of multiple frequency bins, such that for each frequency bin, a loudness threshold is independently set. Here, a signal that falls under a specific loudness threshold is not optimized further in order to optimize further that particular frequency bin.

As an additional example, applying a perceptual loss function to the neural network can be carried out by implementing frequency masking such that a frequency component is not further processed if a computed error is below a masking threshold, where the masking threshold is based upon a target signal. As an example, a frequency component is not further processed if a computed error rate is less than a predetermined range of a target signal. As another example, frequency masking is performed for an error rate that falls outside a predetermined decibel range of the target signal. As with the loudness threshold, frequency masking can be based upon frequency bins, e.g., by selecting a specific masking threshold for each of multiple frequency bins.

As yet another example, applying a perceptual loss function to the neural network can be carried out by establishing a set of frequency bands that are selected to model a predetermined pattern.

In yet further embodiments, applying a perceptual loss function includes implementing one or more of the above-described perceptual loss functions.

In the illustrated process 200, the training at 202 yet further includes adjusting the neural network parameters at 208, e.g., changing or otherwise adjusting at least one parameter of the neural network responsive to the output of the perceptual loss function. In any particular iteration, depending upon the processing, it is possible that no changes are made, one parameter is updated, or multiple parameters are updated, etc.

At 210, a decision is made as to whether the iterative process should continue training. For instance, if the training data reveals that the model has not converged to a sufficient accuracy, then training may continue. If additional training data is available to be consumed, then training may continue, etc. On the other hand, if training is judged to be complete, then the process 200 continues on to outputting at 212.

The process 200 also comprises outputting, at 212, e.g., outputting a neural model file that can be loaded to generate a virtualization of the reference audio system. In some embodiments, the output can also and/or alternatively comprise a virtualization of the reference audio system, a trained artificial neural network, etc. Thus, the output can be a set of weight vectors, other data characterizing the reference audio amplifier, e.g., the neural model file 130 (FIG. 1), the artificial neural network itself, etc.

Notably, the systems and processes herein provide several notable features. For instance, training is end-to-end, such that all parameters are trained at the same time. Moreover, the modeling audio system is capable of real-time processing of an input audio signal, to produce a real-time output. For instance, as noted in FIG. 1, the modeling audio system is intended to be used as an alternative to a reference audio system, e.g., guitar amplifier. Accordingly, the response must be real-time or near real-time so as to audibly seem like real-time. Moreover, the system must be able to be used in the time domain (e.g., respond to a musician performing in real-time through the modeling audio system (i.e., not merely limited to processing files). As such, an example of using the virtualization only consists of time domain processing, whereas training consists as mix of time domain and frequency domain processing. In this regard, the system trains a causal (or almost casual) systems.

Thus, the process herein can train a neural network that digitally models a reference audio system, where the neural network is trained in an end-to-end fashion (all parameters are updated simultaneously during training), processes audio in the time domain (i.e., the input and the output of the neural network correspond to time domain audio signals), is defined as a causal system or a system with an imperceptible algorithmic latency (e.g., <20 ms), combinations thereof, etc.

Conceptual Artificial Neural Network

Figure 3:
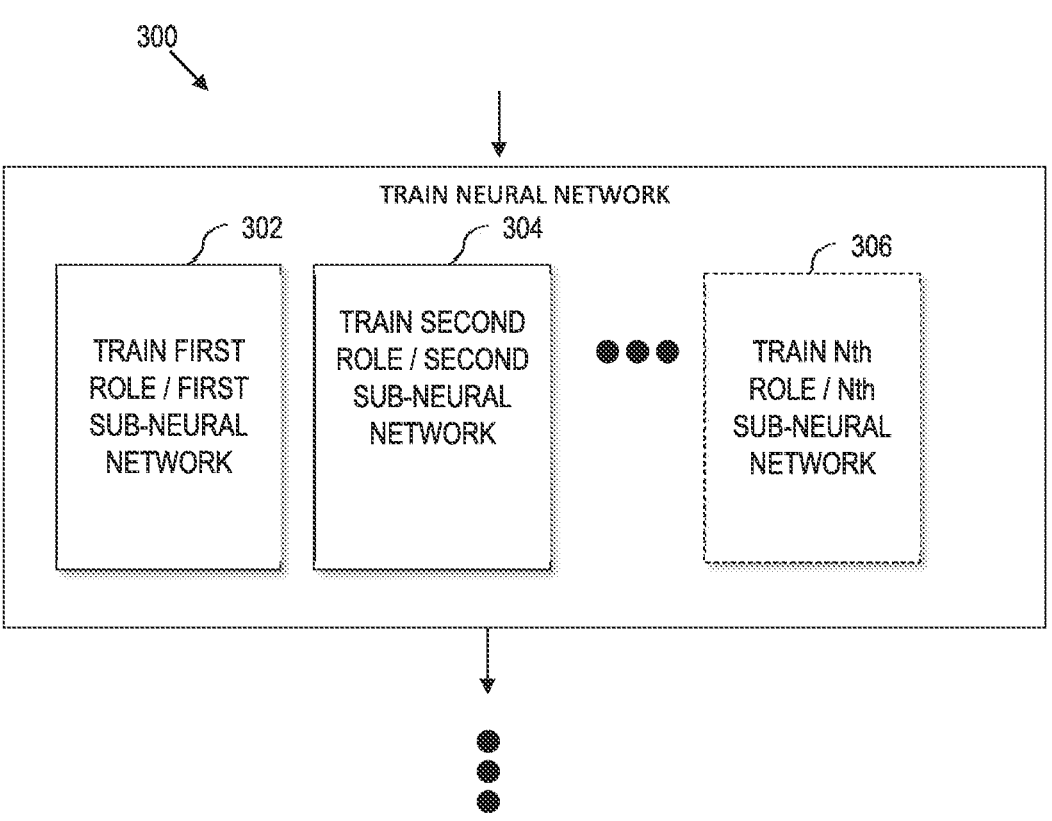
FIG. 3 is a flow chart illustrating an example process for implementing the training operation in the flowchart of FIG. 2, according to aspects of the present disclosure.

Referring to FIG. 3, a process 300 illustrates an example implementation that results from training a neural network (e.g., as carried out by training 202 FIG. 2).

By way of example, a first role 302 of the neural network (conceptually illustrated as a first sub-neural network for illustration) models a nonlinearity of the reference audio system. A second role 304 of the neural network (conceptually illustrated as a second sub-neural network for illustration) models a first linear aspect and/or a temporal dependency of the reference audio system. The above can be extended to include other roles 306 (conceptually illustrated as an Nth sub-neural network for illustration). Moreover, the roles can be reversed. For instance, the first role 302 can model a first linear aspect and/or a temporal dependency of the reference audio system, whereas the second role 304 can model a nonlinearity of the reference audio system. Training each role of the neural network can occur at the same time such that all the parameters of the model are learned simultaneously. In other embodiments, training can be carried out in discrete sections or steps, e.g., depending upon the selected architecture for the sub-neural networks.

By way of example, the first role 302 of the neural network can be implemented as a multi-layer perceptron that models the nonlinearity present in the reference audio system.

Training the neural network can also comprise training a convolutional neural network. For instance, the second role 304 of the neural network can be implemented as a convolutional neural network that models at least one linear aspect and/or at least one temporal dependency of the reference audio system.

In some embodiments, there are two roles. However, in other embodiments there can be any number of roles and/or sub-neural networks, e.g., three or more. For instance, the process 300 can further comprise training, at 306, a third role/sub-neural network to model a second linear (or other) aspect of the reference audio system.

In this example, the process 300 comprises training such that a first role of the neural network models a non-linear behavior of the reference audio system, a second role of the neural network models a first linear aspect of the reference audio system, and a third role of the neural network models a second linear aspect of the reference audio system. In this regard, the first role of the neural network, the second role of the neural network, and the third role of the neural network can essentially form a Wiener-Hammerstein topology.

In example embodiments, the first sub-neural network, the second sub-neural network, the third sub-neural network (and optionally, any number of additional sub-neural networks) can be arranged in series, parallel, or a combination thereof. Thus, for instance, modeling a nonlinearity of the reference audio system, modeling a first linear aspect and/or a temporal dependency of the reference audio system, and modeling a second linear aspect of the reference audio system can be carried out so as to be arranged in series, parallel, or a combination thereof.

As an illustrative example, the first sub-neural network and the second sub-neural network (and optionally, any number of additional sub-neural networks) can be extended to a paralleled filter-waveshaper-filter configuration. In another illustrative example, the first sub-neural network and the second sub-neural network (and optionally, any number of additional sub-neural networks) are extended to any combination order of waveshapers and filters. As with the above-examples, the term "sub-neural network" can be construed physically or conceptually, e.g., to designate role, depending upon the application.

Perceptual Loss Function Generally

Aspects herein may be implemented largely in software, e.g., using a computer (e.g., desktop, laptop, etc.), and audio interface. However, other aspects herein are implemented in specialized hardware, e.g., a digital signal processor (DSP) executing in a form factor suitable for use by musicians, e.g., on stages, studios, and other performance settings. As such, aspects herein provide techniques to minimize the time required to train a neural network to virtualize a reference audio system.

In this regard, the perceptual loss function (e.g., see applying at 206, the perceptual loss function in FIG. 2) can be used to make decisions about training such that a reference audio system can be virtualized in a timeframe tolerable by musicians, e.g., orders of minutes compared to the hours conventionally required by typical artificial neural networks.

According to aspects of the present disclosure the perceptual loss function applies a first thresholding function and a second thresholding function. The first and second thresholding functions shorten training cycles, and hence speed up the time required to train the artificial neural network. The first thresholding function exploits the concept of absolute threshold of hearing. That is, the neural network is not penalized for errors in the prediction which the human ear is typically not sensitive enough to pick up, even in optimal, quiet conditions. In general, a threshold level of the first thresholding function can be set at a level such that even if the error signal by itself were output to the listener, the listener would not hear the frequency components which fall under the absolute threshold of hearing.

The second thresholding function exploits auditory masking. Masking refers to the phenomenon where a louder sound masks a quieter sound happening simultaneously such that a typical listener cannot hear the quieter sound. In an example implementation, a neural network prediction is modeled as being a sum of the target signal and some error (error=prediction−target, therefore, prediction=target+error). This algorithm enables the concept of masking, since the perceptual loss function processes two signals that are "playing" simultaneously. In one example, at a given critical band, if the error is below a masking threshold, e.g., if the error is much smaller than the target (e.g. −24 dB), then the error of the model is judged to be sufficiently inaudible, and the prediction is judged to sound sufficiently identical to the target.

Thus, the neural network is not penalized for errors in the prediction where the prediction is below the masking threshold (e.g., at each critical band).

Specific Example of a Perceptual Loss Function

Figure 4:
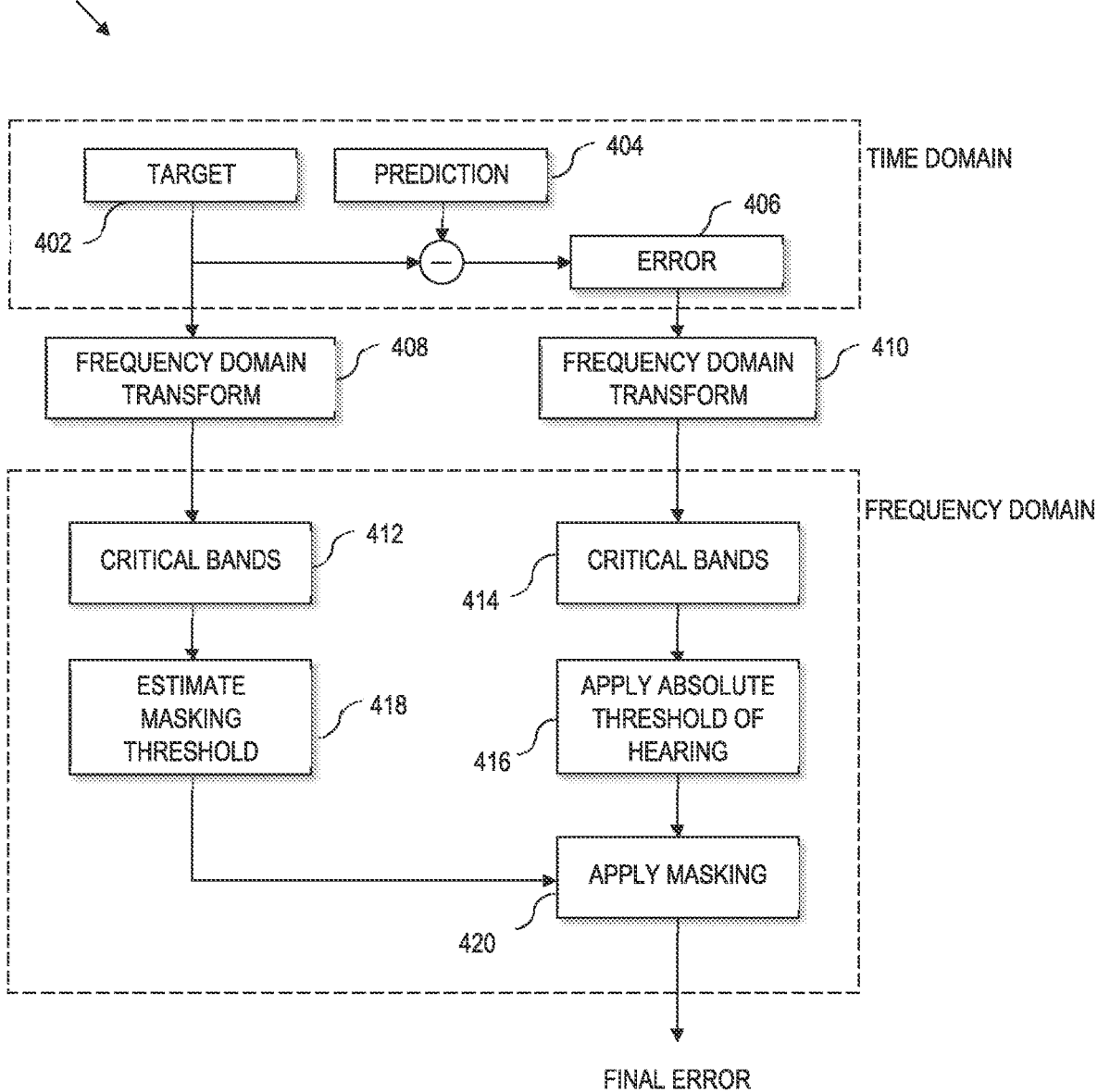
FIG. 4 is a block diagram illustrating a perceptual loss function algorithm that can be used to apply a perceptual loss function in the flow chart of FIG. 2, according to aspects of the present disclosure.

Referring to FIG. 4, a block diagram illustrates an example process 400 for implementing the perceptual loss function, e.g., applying at 206, the perceptual loss function in FIG. 2, training the artificial neural network 126 in FIG. 1, etc.

Given a target signal at 402 (e.g., an expected output of the reference audio system) and a predicted signal 404 predicted by the neural network (see 204, FIG. 2), the process 400 calculates an error signal 406 in the time domain.

The process 400 the proceeds to implement a perceptual loss function. As illustrated, the perceptual loss function takes into account both the target and the error. In particular, as shown in this example, the process 400 converts the target to the frequency domain at 408, and converts the error to the frequency domain at 410.

In some embodiments, the process 400 applies a target critical band filter 412 to the transformed target signal so as to produce a target signal component at each critical band of the target critical band filter 412. Where critical band filtering is implemented, the process 400 may also and/or alternatively apply an error critical band filter 414 to the transformed error signal to produce an error signal at each error critical band. Here, the target critical band filter 412 and the error critical band filter 414 may be similar, or the target critical band filter 412 and the error critical band filter 414 may comprehend different bands.

In practical applications, a critical band filter is a band-pass filter that aggregates frequencies that are close enough to each other that they are perceptually indistinguishable, or at least judged to be indistinguishable for the particular implementation. Thus, a critical band is analogous to a frequency bin described more fully herein. The range of frequencies that are grouped into each band (e.g., frequency bin) can be selected based predetermined conditions and/or definitions, rules, dynamically detectable conditions, combinations thereof, etc. Since each critical band is defined around a center frequency, multiple critical bands are typically used to cover the whole frequency range. In an example implementation, several critical bands are used jointly based upon predetermined ranges derived from knowledge of auditory perception, addressing different parts of the audible frequency range. As such, aspects herein either reference in plural (critical bands), or to a "critical band filter bank", where a filter bank is essentially a set of filters applied all together (e.g., frequency bin).

The process 400 can comprise thresholding the error signal in the frequency domain according to a frequency-dependent threshold level, where the threshold level is established based upon a predetermined threshold of hearing.

As illustrated, an absolute threshold of hearing 416 is applied to the error signal that has been processed by the critical band filter 414. Applying the absolute threshold of hearing 416 can be carried out for instance, so that the error at each critical band is not minimized further if it is estimated to be inaudible at that critical band by the process 400. For instance, in an example implementation, a frequency-dependent absolute threshold of hearing curve is used to establish a unique threshold for each critical band. The curve data may be derived from, for instance, a curve that takes into account the sensitivity of human hearing at different frequencies (e.g., based upon an average listener or other metric) to establish frequency dependent threshold values.

Moreover, the process 400 can comprise establishing a frequency-dependent mask thresholding level based on the target signal, and thresholding the error signal in the frequency domain according to the established frequency-dependent mask thresholding level.

For instance, as also illustrated in the process 400, a masking threshold 418 is estimated from the target signal at each critical band of the target critical band filter 412. For instance, in an example implementation, the masking threshold is estimated as a level below a predetermined amount of the energy of the target signal at each critical band (e.g., −24 dB of the energy of the target signal). As such, frequency masking can be utilized by the perceptual loss function.

Additionally, the masking threshold 418 estimated from the target signal is applied to the error signal via masking 420. Thus, frequency masking is dependent on the target signal, but it is applied to the error signal in the illustrated example. The output of the masking 420 is a final error that is used to adjust the weights of the artificial neural network.

By way of illustration, in an example implementation, it may not be worth checking the error signal if the error signal is quieter than the attenuated (e.g., −24 dB) target. In some embodiments, applying the absolute threshold of hearing 416 and applying masking 420 can occur in any order, series, parallel, etc.

Notably, the operations described here are differentiable. Thus, the system can calculate loss gradients with regard to the predicted signal (i.e., carry out error backpropagation for updating the terms in a neural network). As such, all of the operations are differentiable so as to be able to calculate gradients with regard to the predicted signal.

In a specific working example implementation, a process of applying a perceptual loss function thus comprises receiving a target signal and an error signal (computed from the target and a predicted output of the model). Moreover, the process includes converting the target signal and the error signal to the frequency domain, applying critical band filtering to the target signal in the frequency domain, and applying critical band filtering to the error signal in the frequency domain. The process also comprises thresholding the error signal, e.g., using the concept of the absolute threshold of hearing, such that errors at critical bands which are estimated inaudible by the process 400, e.g., based upon data indicative of the average listener, are not further minimized.

The above process may further comprise attenuating the target signal for establishing a frequency masking level, which is used to threshold the error signal in the frequency domain to verify that the error signal contains loud enough information for further processing. However, in alternative embodiments, not all of the illustrated perceptual loss functions need be applied. Rather, any combination of critical banding, masking, attenuation, thresholding, other processes, combinations thereof, etc., can be applied.

The use of perceptual loss function as described herein provides numerous unexpected improvements in addition to providing high sonic quality. The perceptual loss function, as described above, e.g., with reference to FIG. 4, provides an efficient way to train, resulting in fast training that relies upon relatively smaller training sets compared to conventional approaches, and converges to usable virtualizations relatively faster than conventional approaches to amplifier modeling. This enables training to be implemented in hard-ware, e.g., the modeling audio system 106 of FIG. 1. For instance, a conventional approach that could require hours to train can now be trained on an order of magnitude of minutes. Thus, using hardware, e.g., FPGA, digital signal processor (DSP), etc., based hardware, it is practical to train the neural network to model a reference audio system, e.g., a guitar amplifier used by a user/musician. Thus, musicians can utilize the modeling audio system 106 in a form factor of a pedalboard, rackmount, or tabletop processor without the requirement of a general purpose computer. Likewise, aspects herein can be implemented in a software solution that runs on a general purpose computer, e.g., a laptop, in combination with a suitable audio interface. Thus, it is possible to train the neural network with a computer externally. Thus, it is possible to use the trained model with a physical device with less processing power as needed for training the neural network.

Additionally, the final error signal output from the masking 420 provides more information than merely masking. For instance, because the perceptual loss function is linked to hearing, the amount of error is also an indication of how good the virtualization is at the current state of training. That is, the smaller the error, the closer the virtualization will sound to the musician like the reference audio system. Comparatively, some conventional neural networks may digress in such a way to spend considerable resources processing training data that minimizes error in ways that are not in a meaningful metric to a musician/user that is using the virtualization to simulate a reference audio system. Moreover, by utilizing masking, threshold of hearing, other psychoacoustic properties, combinations thereof, etc., training data is minimized by stopping error feedback where improvements, although feasible, do not have an audible impact.

As noted more fully herein, aspects of the present disclosure apply perceptually motivated frequency domain processing on the target signal and on the error signal. This is in contrast to conventional approaches, which apply processing on the target signal and the prediction signal. Notably, this approach retains the phase information in the target signal.

This means that the model can match not only the frequency response magnitude of the reference audio system, but also the frequency response phase. While the human hearing is somewhat insensitive to phase, in practice, it is difficult to create accurate models of these systems if the loss function does not penalize for phase mismatches. Also, in some reference audio systems, retaining the phase information is crucial for creating faithful models of these systems. In this regard, computing the error signal in the time domain allows the process to do so while simultaneously applying perceptually motivated functions such as critical banding in the frequency domain.

That is, in some embodiments, critical banding is applied simultaneously with strict phase matching on a single loss function.

Moreover, aspects herein simultaneously preserves phase but also allow penalizing different frequency bands in a perceptually relevant way.

Using the Modeling Audio System

As noted more fully herein, a pre-training (i.e., smart initialization) can be utilized to prepare features for training a neural network to model an associated reference audio system. Depending upon the implementation, a user may be able to select a configuration/structure of the model, e.g., either at the time of building the artificial neural network, or within the modeling audio system. By controlling the structure in the modeling audio system, a user can use models to build new and/or different audio systems, including audio systems that never existed before, but which are based upon at least one existing reference audio system. Thus, in some embodiments, the modeling audio system provides an interface, e.g., a graphical user interface, that enables a user to build modular systems by assembling functional processing blocks in series, parallel, or a combination thereof.

Reference is now drawn to FIG. 5-FIG. 9, which depict various example models that can be created for instance, within the modeling audio system 106 of FIG. 1.

Figure 5:
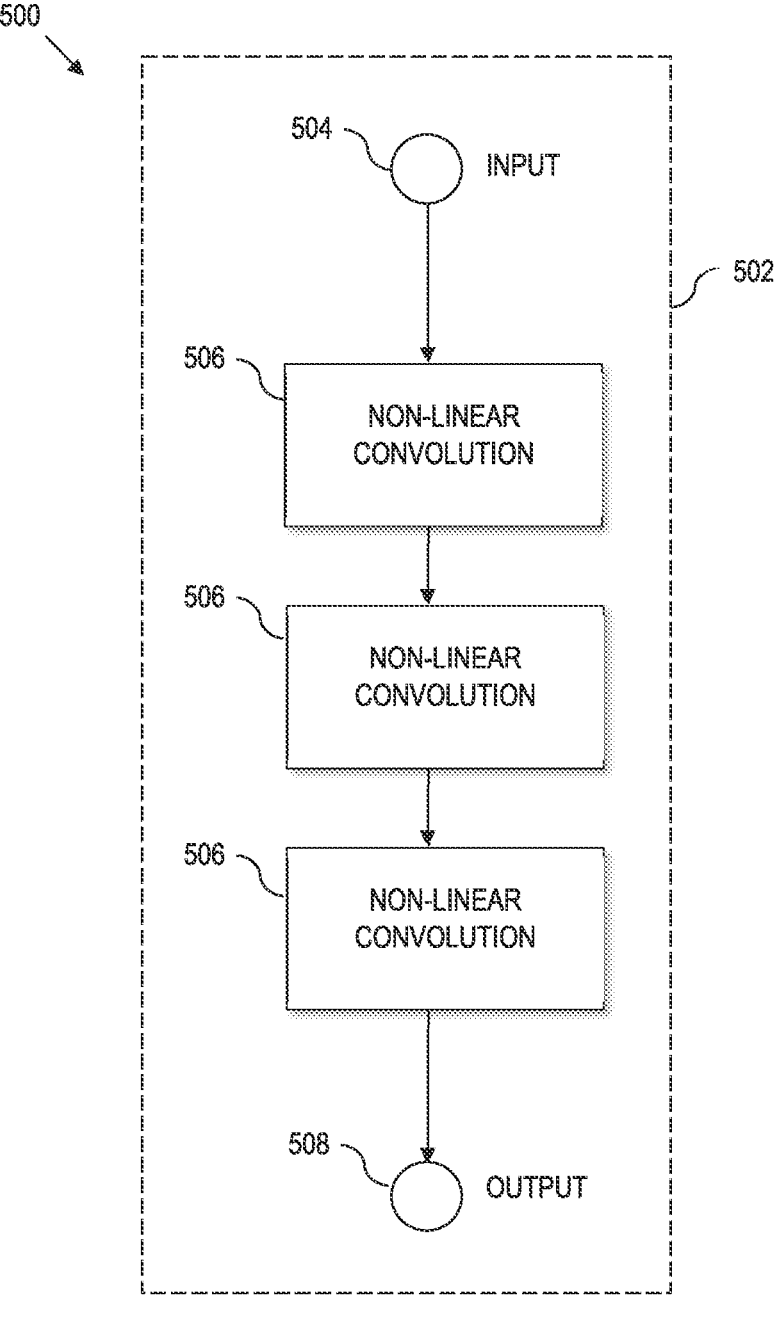
FIG. 5 is an example model according to aspects of the present disclosure.

Referring to FIG. 5, a block diagram 500 of a model 502 is built using an input 504 that feeds a series of non-linear convolutions 506 that terminate in an output 508. In this example, a model is built based upon the trained neural network, or a series combination of trained neural networks, with a single input and a single output.

Figure 6:
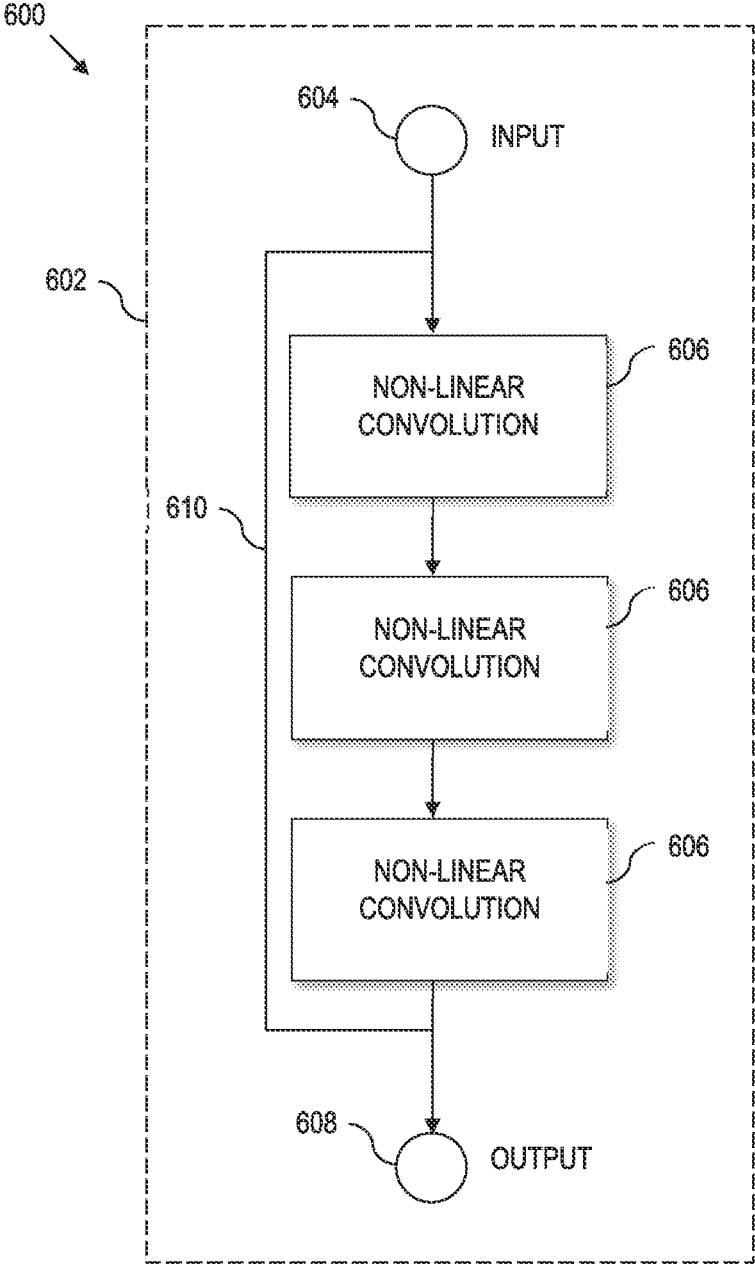
FIG. 6 is an example of another model according to aspects of the present disclosure.

Referring to FIG. 6, a block diagram 600 illustrates that a model 602 is built using an input 604 that feeds a series of non-linear convolutions 606 that terminate in an output 608. Also, the input 604 feeds a bypass loop 610 that terminates at the output 608. This modular setup illustrates an example set of user customized connections to allow a linear combination between a pre-trained model and input signal.

Figure 7:
FIG. 7 is an example of yet another model according to aspects of the present disclosure.

Referring to FIG. 7, a block diagram 700 illustrates that a model 702 is built using an input 704 that feeds a first series of non-linear convolutions 706 that terminate in an output 708. The input 704 also feeds a second series of non-linear convolutions 706 that terminate in the output 708. This modular setup illustrates an example set of user customized connections to allow parallel models. In example implementations, a user controls the amount of each model fed to the output.

Figure 8:
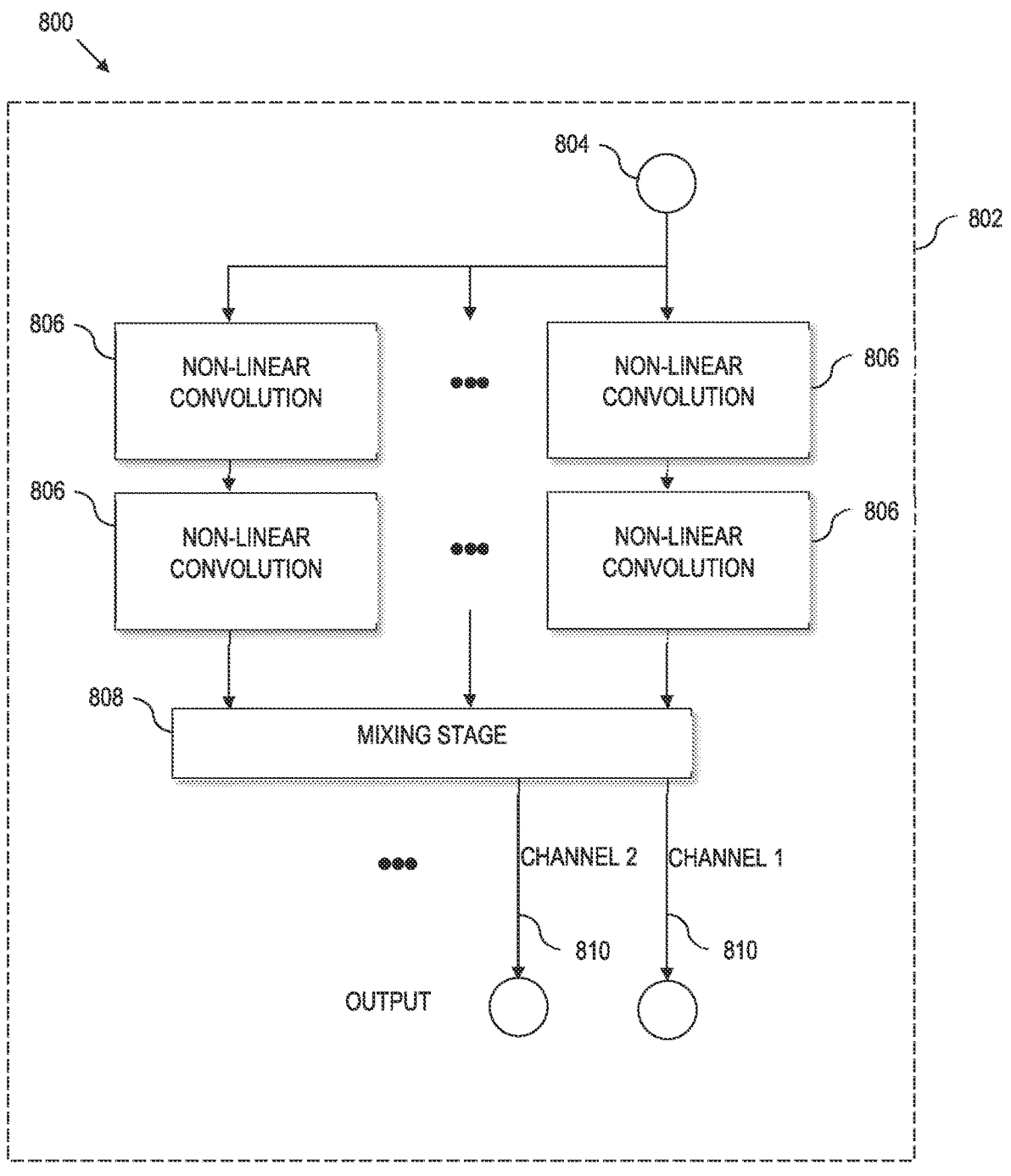
FIG. 8 is an example of still another model according to aspects of the present disclosure.

Referring to FIG. 8, a block diagram 800 illustrates that a model 802 is built using an input 804 that feeds a first series of non-linear convolutions 806 that terminate in a mixing stage 808. The input 804 also feeds a second series of non-linear convolutions 806 that terminate in the mixing stage 808. The mixing stage 808 provides one or more independent output channels 810. This modular setup illustrates an example set of user customized connections to allow parallel models. In example implementations, a user controls the amount of each model fed to the output(s), so as to create a multi-channel audio system for performance in mono, stereo, multi-channel, etc., configurations.

Figure 9:
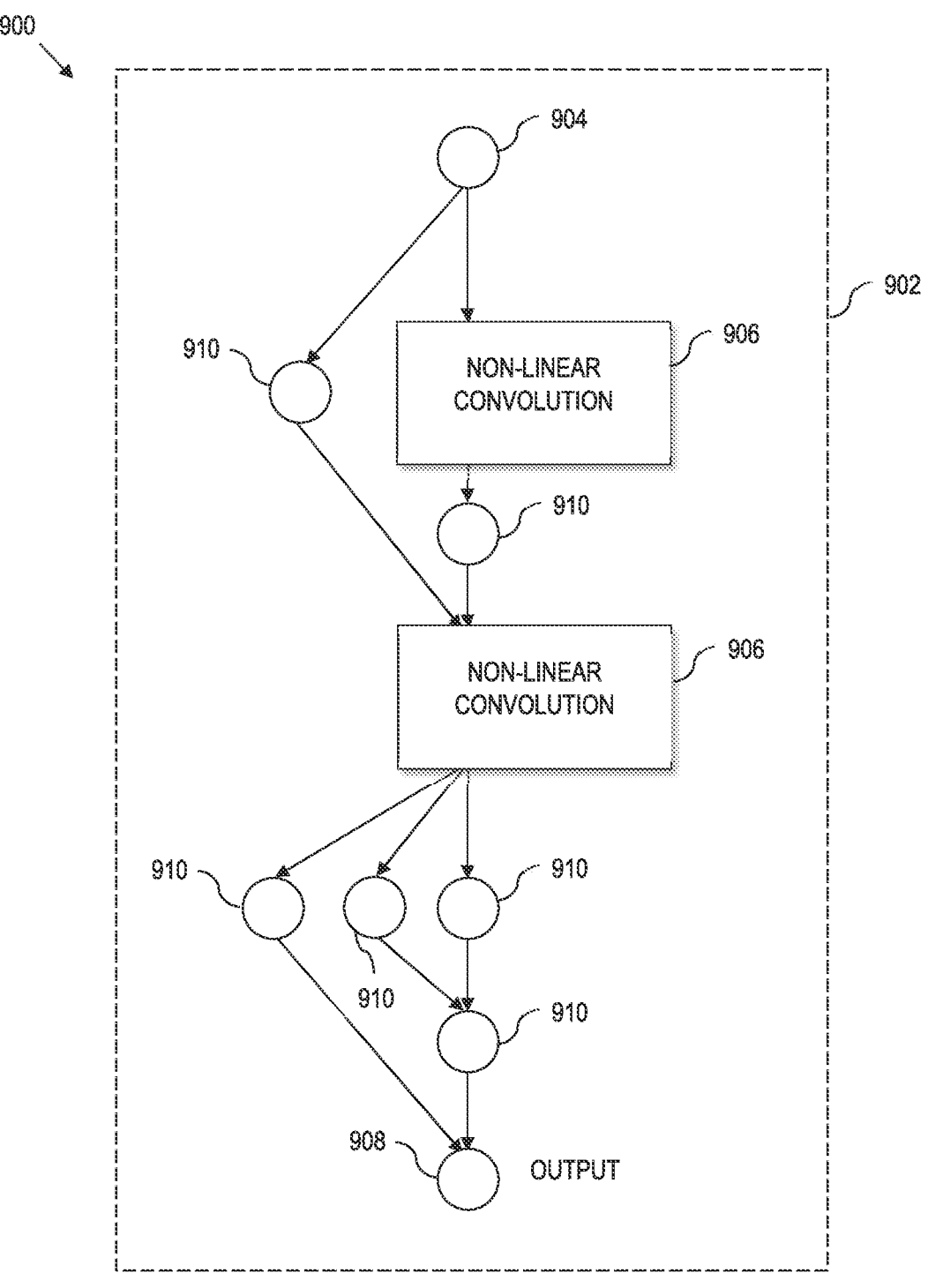
FIG. 9 is an example of yet another model according to aspects of the present disclosure.

Referring to FIG. 9, a block diagram 900 illustrates that a model 902 is built using an input 904 that feeds non-linear convolutions 806 that ultimately terminate in an output 908. The input 904 can also feed one or more parallel paths with intermediate nodes 910, each node serving as a mixing node, summing node, difference node, splitter node, node that carries out a pre-programmed function, weighted function, etc. This configuration is merely illustrative as a user may have the ability to fully customize series and parallel paths, with any combination of non-linear convolutions 906 and/or intermediate nodes 910. In other embodiments, the system itself may auto derive a configuration, e.g., based upon an automated analysis of some pre-recorded audio, by receiving metadata, configuration data, combinations thereof, etc.

Example Computer System

Figure 10:
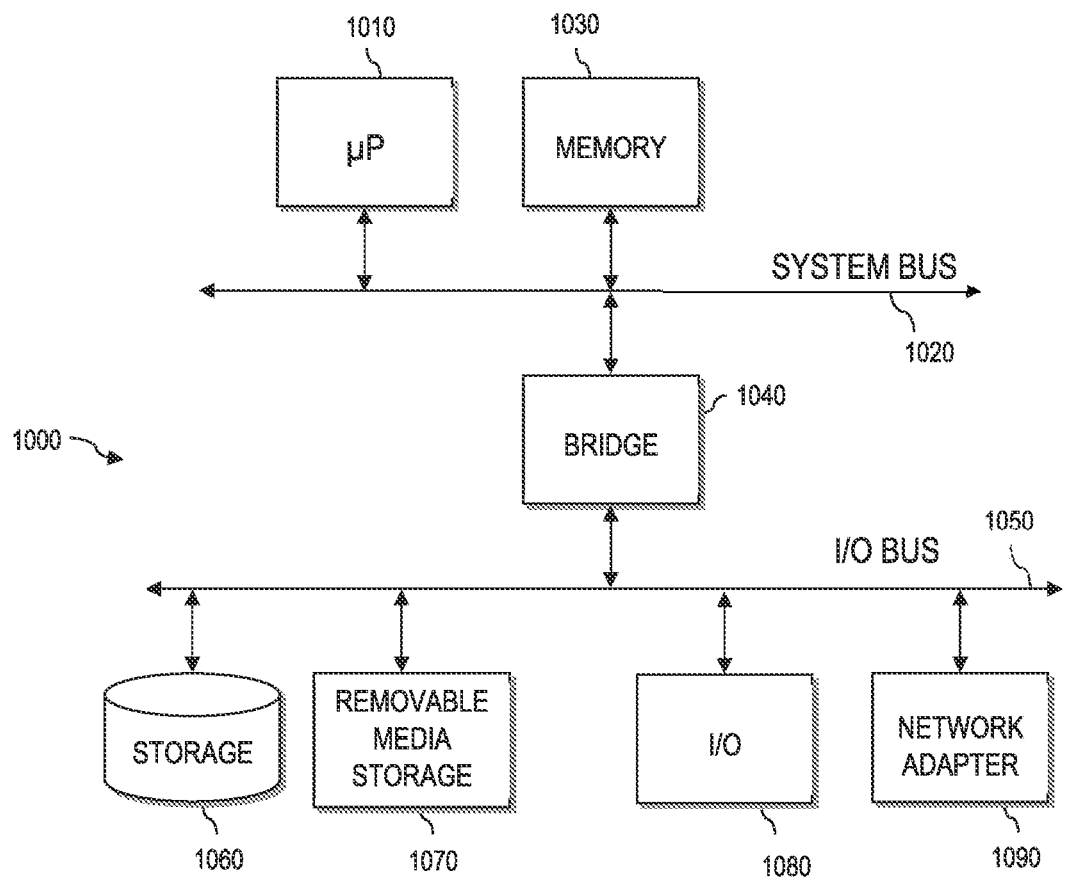
FIG. 10 is a block diagram of a computer system having a computer readable storage medium for implementing functions according to various aspects of the present disclosure as described in greater detail herein.

Referring to FIG. 10, a block diagram of a hardware data processing system is depicted in accordance with the present disclosure. The depicted data processing system is a non-limiting example of a processing platform capable of implementing one or more of the functions described with reference to the preceding FIGURES. Data processing system 1000 may comprise at least one processor 1010 connected to system bus 1020. Also connected to the system bus 1020 is memory 1030. A bridge 1040 interfaces the system bus 1020 to an I/O bus 1050. The I/O bus 1050 is utilized to support one or more buses and corresponding devices, such as storage 1060, removable media storage 1070, input/output devices 1080, a network adapter 1090, other devices, combinations thereof, etc. For instance, a network adapter 1090 can be used to enable the data processing system 1000 to communicate with other data processing systems or storage devices through intervening private or public networks.

The memory 1030, storage 1060, removable media storage 1070, or combinations thereof can be used to store program code that is executed by the processor(s) 1010 to implement any aspect of the present disclosure described and illustrated in FIGS. 1-9.

As will be appreciated by one skilled in the art, aspects of the present disclosure may be embodied as a system, method or computer program product. Moreover, some aspects of the present disclosure may be implemented in hardware, in software (including firmware, resident software, microcode, etc.), or by combining software and hardware aspects. Furthermore, aspects of the present disclosure may take the form of a computer program product embodied in one or more computer readable storage medium(s) having computer readable program code embodied thereon.

In certain embodiments, any combination of one or more computer readable medium(s) may be utilized. The computer readable medium may be a computer readable storage medium or a computer readable signal medium. A computer readable storage medium may be a primary storage device, or a secondary storage device (which may be internal, external, or removable from the host hardware processing device). In the context of this document, a computer readable storage medium may be any tangible (hardware) medium that can contain, or otherwise store a program for use by or in connection with an instruction execution system, apparatus, or device.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A process for training a neural network that digitally models an audio system, comprising:

utilizing a sound source to electrically couple a test signal into an input of a reference audio system;

collecting an output of the reference audio system into an audio interface coupled to a computer to store captured information;

training a neural network using the test signal and the captured information to derive a set of weight vectors with appropriate values such that:

the overall output of the neural network converges towards an output representative of the reference audio system; and a digital signal representing an analog musical instrument signal is processed through the trained neural network in the time domain with an algorithmic latency under 20 milliseconds;

outputting to a graphical user interface, a graphical representation of the trained neural network, the graphical representation visually displaying at least one virtual control; and enabling a user to interact with the virtual control of the graphical representation of the trained neural network via the graphical user interface to define a virtualization of the reference audio system.

2. The process of claim 1, wherein the training is carried out on the computer.

3. The process of claim 1, wherein the training is carried out on a separate, remote computer.

4. The process of claim 1, wherein training the neural network further comprises:

setting a stopping condition that determines when training ends by performing at least one of:

setting a user-initiated stopping condition; or processing a number of iterations of the training data as the stopping condition.

5. The process of claim 1, wherein training the neural network further comprises:

setting a stopping condition that determines when training ends by processing a perceptual loss function where the perceptual loss function serves as an indicator of the stopping condition.

6. The process of claim 1, wherein:

outputting to the graphical user interface, the graphical representation of the trained neural network further comprises outputting to the graphical user interface, a graphical representation of an effects processor that is not within a native capability of the reference audio system.

7. The process of claim 6, wherein:

outputting to the graphical user interface, the graphical representation of the effects processor that is not within the native capability of the reference audio system comprises outputting to the graphical user interface, a graphical representation of an equalizer for equalization, wherein the equalizer is not part of the reference audio system.

8. The process of claim 6, wherein:

outputting to the graphical user interface, the graphical representation of the effects processor that is not within the native capability of the reference audio system comprises outputting to the graphical user interface, a graphical representation of a dynamics processor, wherein the dynamics processor is not part of the reference audio system.

9. The process of claim 1, wherein:

outputting to the graphical user interface, the graphical representation of the effects processor that is not within the native capability of the reference audio system comprises outputting to the graphical user interface, a graphical representation of a time-based processor, wherein the time-based processor is not part of the reference audio system.

10. A process for training a neural network that digitally models an audio system, comprising:

utilizing a sound source to electrically couple a test signal into an input of a reference audio system;

collecting an output of the reference audio system into an audio interface coupled to a computer to store captured information;

training a neural network using the test signal and the captured information to derive a set of weight vectors with appropriate values such that the overall output of the neural network converges towards an output representative of the reference audio system, and a signal in the time domain from a musical instrument is processed through the trained neural network with a latency under 20 milliseconds;

outputting to a graphical user interface, a graphical representation of the trained neural network, the graphical representation visually displaying at least one virtual control; and enabling a user to interact with the virtual control of the graphical representation of the trained neural network via the graphical user interface to define a virtualization of the reference audio system;

wherein training the neural network further comprises modeling a non-linear behavior of the reference audio system, modeling a first linear aspect of the reference audio system, and modeling a second linear aspect of the reference audio system.

11. The process of claim 1, wherein:

outputting to the graphical user interface, the graphical representation of the trained neural network further comprises outputting to the graphical user interface, a graphical representation of at least one of an emulation of a speaker and an emulation of a speaker cabinet, wherein the emulation is not part of the reference audio system.

12. The process of claim 1, wherein:

training the neural network models a non-linear behavior and a linear aspect of the reference audio system.

13. The process of claim 1, wherein:

training the neural network further comprises creating a model file that includes sufficient data such that that when read out and processed by a modeling audio system, a functioning model of the reference audio system is realized; wherein:

the virtualization comprises a framework that enables the modeling audio system to model the reference audio system by loading the model file into the modeling audio system.

14. A process for creating digital audio systems, comprising:

utilizing a sound source to electrically couple a test signal into an input of a reference audio system;

collecting an output of the reference audio system into an audio interface coupled to a computer to store captured information;

training a neural network using the test signal and the captured information to derive a set of weight vectors with appropriate values such that the overall output of the neural network converges towards an output representative of the reference audio system, wherein the training digitally models a non-linear behavior of the reference audio system, models a first linear aspect of the reference audio system, and models a second linear aspect of the reference audio system, the training carried out by repeatedly performing operations comprising:

predicting by the neural network, a model output based upon an input, where the output approximates an expected output of the reference audio system;

computing an error in the prediction; and adjusting the weight vectors to minimize the computed error;

outputting a neural network model file upon training;

outputting to a graphical user interface, a graphical representation of the trained neural network in the neural network model file, the graphical representation visually displaying at least one virtual control; and enabling a user to interact with the virtual control of the graphical representation of the trained neural network via the graphical user interface to define a virtualization of the reference audio system.

15. The process of claim 14, wherein predicting by the neural network, the model output comprises carrying out the prediction in the time domain.

16. The process of claim 14, wherein:

modeling the non-linear behavior of the reference audio system, modeling the first linear aspect of the reference audio system, and modeling the second linear aspect of the reference audio system are arranged in series, parallel, or a combination thereof.

17. The process of claim 16 further comprising modeling a temporal dependency of the reference audio system in addition to, or in lieu of modeling the first linear aspect of the reference audio system.

18. The process of claim 14, wherein the training further comprises:

applying a perceptual loss function to the neural network based upon a determined psychoacoustic property, wherein the perceptual loss function is applied in the frequency domain; and adjusting the neural network responsive to the output of the perceptual loss function.

19. The process of claim 18, wherein applying the perceptual loss function to the neural network comprises establishing a loudness threshold of hearing for each of multiple frequency bins such that a signal below the loudness threshold is not optimized further, wherein:

for each frequency bin, a loudness threshold is independently set under which a signal is not optimized further in order to optimize further that particular frequency bin.

20. The process of claim 18, wherein applying the perceptual loss function to the neural network comprises:

implementing frequency masking such that a frequency component is not further processed if a computed error is below a masking threshold, where the masking threshold is based upon a target signal.

* * * * *